US008417187B2

(12) United States Patent  
Chen et al.

(10) Patent No.: US 8,417,187 B2
(45) Date of Patent: Apr. 9, 2013

(54) METHODS AND APPARATUS FOR WIRELESS DEVICE COEXISTENCE

(75) Inventors: Camille Chen, Cupertino, CA (US); Michael A. Robinson, Menlo Park, CA (US); Marco Pontil, Sunnyvale, CA (US); Michael J. Giles, San Jose, CA (US)

(73) Assignee: Apple Inc., Cupertino, CA (US)

( * ) Notice: Subject to any disclaimer, the term of this patent is extended or adjusted under 35 U.S.C. 154(b) by 1493 days.

(21) Appl. No.: 12/006,992

(22) Filed: Jan. 7, 2008

(65) Prior Publication Data

US 2009/0176454 A1 Jul. 9, 2009

(51) Int. Cl.
*H04B 1/00* (2006.01)

(52) U.S. Cl.
USPC ...... 455/63.1; 455/41.2; 455/552.1; 455/419; 370/338; 375/132

(58) Field of Classification Search ........... 455/63.1, 455/41.2, 63.4, 403, 419, 445, 462, 524, 455/552.1; 370/338; 375/132, 133
See application file for complete search history.

(56) References Cited

U.S. PATENT DOCUMENTS

| 6,978,121 | B1 | 12/2005 | Lane et al. |
| 7,546,142 | B2 | 6/2009 | Ginzburg et al. |
| 7,701,913 | B2* | 4/2010 | Chen et al. ................ 370/338 |
| 2005/0215197 | A1 | 9/2005 | Chen et al. |
| 2005/0239497 | A1* | 10/2005 | Bahl et al. ................ 455/552.1 |
| 2006/0030265 | A1 | 2/2006 | Desai et al. |
| 2006/0030266 | A1 | 2/2006 | Desai et al. |
| 2006/0084383 | A1 | 4/2006 | Ibrahim et al. |
| 2006/0133259 | A1 | 6/2006 | Lin et al. |
| 2006/0274704 | A1 | 12/2006 | Desai et al. |
| 2007/0060055 | A1 | 3/2007 | Desai et al. |
| 2007/0099567 | A1 | 5/2007 | Chen et al. |
| 2007/0224936 | A1* | 9/2007 | Desai ........................ 455/41.2 |

* cited by examiner

*Primary Examiner* — Shaima Q Aminzay
(74) *Attorney, Agent, or Firm* — Cazdzinski & Associates, PC

(57) ABSTRACT

Methods and apparatus for compensating for the effects of interference between multiple wireless communication apparatus. In one embodiment, the method comprises providing a first wireless communication apparatus operating in a first band and a second wireless communication apparatus operating at least partly in the first band, where the second wireless communication apparatus operates according to a different communication protocol than the first wireless communication apparatus. Interference is compensated for between the first wireless communication apparatus and the second wireless communication apparatus by selecting and operating according to one of a plurality of operational protocols. In another embodiment, the first wireless communication apparatus and the second wireless communication apparatus operate in a closed-loop relationship to cooperatively compensate for communication interference.

20 Claims, 9 Drawing Sheets

(1 OF 2)

(2 OF 2)

METHODS AND APPARATUS FOR WIRELESS DEVICE COEXISTENCE

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND OF THE INVENTION

1. Field of Invention

The present invention relates generally to the field of wireless communication and data networks. More particularly, in one exemplary aspect, the present invention is directed to compensating for or mitigating the effects of electromagnetic signal interference in devices implementing two or more wireless air interfaces or protocols.

2. Description of Related Technology

The effective implementation of convergence products has led to a revolution in the way consumers view computerized devices. These next generation computerized devices focus on offering consumers a substantially unified solution for a variety of services to which consumers have become accustomed. One example of such a converged solution is the exemplary "M82" laptop computer or iPhone™ each manufactured by the Assignee hereof, which support a variety of wireless protocols and other functions. For instance, the iPhone™ has the capability of, among other things, sending and receiving emails over a WLAN network, making and receiving calls using a GSM cellular network, and operating wireless peripheral equipment (such as wireless headsets) using the Bluetooth protocol.

As technologies converge, implementation requirements and constraints, including cost, size, and antenna isolation in these hardware systems inevitably will introduce difficulties which can potentially result in a poor user experience with the device. For example, both Bluetooth and WLAN (802.11b/g/n) share the same ISM band in the 2.4-2.8 GHz frequency range. Due to the close physical proximity of these wireless interfaces (including their antenna) in these converged or unified devices, the Bluetooth and WLAN technologies can interfere with each other when operating simultaneously, and can cause problems such as for example Bluetooth audio stutter and drop-outs, slow WLAN transfer speeds, poor Bluetooth mouse tracking, etc.

Several solutions have been contemplated in the prior art to address the co-existence problems of co-located or proximate wireless technologies. For example, United States Patent Publication No. 20070099567 to Chen; et al. published May 3, 2007 and entitled "Methods and apparatus for providing a platform coexistence system of multiple wireless communication devices" discloses various embodiments of methods and apparatus for providing a platform coexistence system of multiple wireless communication devices.

United States Patent Publication No. 20070080781 to Ginzburg; et al. published Apr. 12, 2007 and entitled "Device, system and method of coordination among wireless transceivers" discloses devices, systems and methods of coordination among wireless transceivers. For example, an apparatus in accordance with an embodiment of the invention includes first and second wireless transceivers, wherein the first wireless transceiver is to enter a non-transmission mode for a pre-defined time period in response to an indication from the second wireless transceiver, and wherein one of the first and second wireless transceivers is to operate in a synchronous network and the other of the first and second wireless transceivers is to operate in a non-synchronous network.

United States Patent Publication No. 20070060055 to Desai; et al. published Mar. 15, 2007 and entitled "Method and system for antenna and radio front-end topologies for a system-on-a-chip (SOC) device that combines Bluetooth and IEEE 802.11 b/g WLAN technologies" discloses a method and system for antenna and radio front-end topologies for a system-on-a-chip (SOC) device that combines Bluetooth and IEEE 802.11 b/g WLAN technologies. A single chip radio device that supports WLAN and Bluetooth technologies receives a WLAN signal in a WLAN processing circuitry of the radio front-end and in a Bluetooth processing circuitry of the radio front-end. Signals generated by the WLAN processing circuitry and the Bluetooth processing circuitry from the received WLAN signal may be combined in a diversity combiner that utilizes selection diversity gain combining or maximal ratio combining (MRC). When a generated signal is below a threshold value, the signal may be dropped from the combining operation. A single antenna usage model may be utilized with the single chip radio device front-end topology to support WLAN and Bluetooth communications.

United States Patent Publication No. 20060274704 to Desai; et al. published Dec. 7, 2006 and entitled "Method and apparatus for collaborative coexistence between Bluetooth and IEEE 802.11g with both technologies integrated onto a system-on-a-chip (SOC) device" discloses a method and system for collaborative coexistence between Bluetooth and IEEE 802.11g with both technologies integrated onto an SOC device. In a single integrated circuit (IC) that handles Bluetooth and WLAN technologies, a WLAN priority level may be selected for WLAN transmissions and a Bluetooth priority level may be selected for Bluetooth transmissions. The WLAN and Bluetooth priority levels may be selected from a plurality of priority levels. A packet transfer scheduler (PTS) may schedule the transmission of WLAN and Bluetooth signals in accordance with the selected priority levels. In some instances, the PTS may promote or demote the priority levels for WLAN and/or Bluetooth transmissions based on traffic needs.

United States Patent Publication No. 20060133259 to Lin; et al. published Jun. 22, 2006 and entitled "Interference rejection in wireless receivers" discloses a wireless system which mitigates the effects of interference through updating noise variance estimates. Noise variance estimates may be updated after the reception of a preamble in an OFDM receiver.

United States Patent Publication No. 20060084383 to Ibrahim; et al. published Apr. 20, 2006 entitled "Method and system for collocated IEEE 802.11 B/G WLAN, and BT with FM in coexistent operation" discloses a method and system for collocated IEEE 802.11 b/g WLAN, and Bluetooth (BT) with FM in coexistent operation are provided. A single chip comprising an integrated BT radio and an integrated FM radio in a coexistence station may generate a priority signal to disable WLAN transmissions in a WLAN radio when a BT HV3 frame is available for transmission. When the priority signal is asserted, an exponentially growing retransmission backoff mechanism in the WLAN radio may be disabled. Moreover, when the BT radio and the WLAN radio are enabled for coexistence operation, a WLAN fragmentation threshold in the WLAN radio may be modified based on a WLAN modulation rate and the BT HV3 frame duration. An on-chip processor that time multiplexes FM and Bluetooth data processing may be utilized to control the BT radio operation and the FM radio operation in the single chip.

United States Patent Publication No. 20060030266 to Desai; et al. published Feb. 9, 2006 and entitled "Method and system for achieving enhanced quality and higher throughput for collocated IEEE 802.11B/G and Bluetooth devices in coexistent operation" discloses a method and system for achieving enhanced quality and higher throughput for collocated IEEE 802.11b/g and Bluetooth (BT) devices in coexistent operation are provided. A priority signal may be generated by a BT radio in a coexistence station to disable WLAN transmissions in a WLAN radio when a BT HV3 frame is available for transmission. When the priority signal is asserted, an exponentially growing retransmission backoff mechanism in the WLAN radio may be disabled. Moreover, when the BT radio and the WLAN radio are enabled for coexistence operation, a WLAN fragmentation threshold in the WLAN radio may be modified based on a WLAN modulation rate and the BT HV3 frame duration.

United States Patent Publication No. 20060030265 to Desai, et al. published Feb. 9, 2006 entitled "Method and system for sharing a single antenna on platforms with collocated Bluetooth and IEEE 802.11 b/g devices" discloses a method and system for sharing a single antenna on platforms with collocated Bluetooth and IEEE 802.11 b/g devices. A single antenna may be utilized for communication of Bluetooth HV3 frame traffic and wireless local area network (WLAN) communication based on a time multiplexing approach. At least one antenna switch may be utilized to configure an antenna system to enable Bluetooth and WLAN coexistence via the single antenna. Configuration signals may be generated by a Bluetooth radio device and/or by a WLAN radio device to configure the antenna system. A default configuration for the antenna system may provide WLAN communication between a station and a WLAN access point until Bluetooth communication becomes a priority.

United States Patent Publication No. 20050215197 to Chen, et al. published Sep. 29, 2005 and entitled "Apparatus and methods for coexistence of collocated wireless local area network and Bluetooth based on dynamic fragmentation of WLAN packets" discloses an 802.11—enabled device may fragment an 802.11 packet into smaller packets and transmit the smaller packets instead of the 802.11 to lessen interference with Bluetooth synchronized connection-oriented communication of a collocated or nearby Bluetooth-enabled device.

Despite the foregoing variety of different approaches, the prior art neither teaches nor suggests an effective technique for compensating for the effects of interference based on an operational criteria (e.g. antenna isolation). Additionally, prior art solutions tend to focus on a "one size fits all" solution that does not take into account the various features and services offered to optimize the user experience.

Accordingly, improved methods and apparatus for compensating for the effects of interference between wireless technologies that at least partly operate in the same frequency bands are needed. Ideally, such improved methods and apparatus could be implemented as either a "closed-loop" (i.e., device communicating with its associated access point or AP for example) or "open-loop" (functionality entirely within the device) manner, thereby increasing the flexibility to compensate for interference according to any number of factors including, but not limited to: (i) antenna isolation, (ii) user priorities, (iii) application priorities, (iv) usage characteristics for the system, and (v) network/AP-related considerations.

Such methods and apparatus would also ultimately provide the user with the best use experience possible, while offering converged services in a unified client device in a space- and power-efficient manner.

SUMMARY OF THE INVENTION

The present invention satisfies the foregoing needs by providing, inter alia, methods and apparatus for the compensating for the effects of interference in a wireless system or device with co-existing air interfaces.

In accordance with a first aspect of the invention, a method of compensating for the interference between multiple wireless communication apparatus in a device is disclosed. In one embodiment, the method comprises providing a first wireless communication apparatus operative in a first frequency band and a second wireless communication apparatus operative at least partly in the first band, where the second wireless communication apparatus operates according to a different communication protocol than the first wireless communication apparatus. The method further comprises compensating for interference between the first wireless communication apparatus and the second wireless communication apparatus by selecting and operating according to one of a plurality of operational protocols.

In one variant, the method further comprises determining the isolation between the first wireless communication apparatus and the second wireless communication apparatus and selecting one of the pluralities of protocols based at least in part on the isolation determination.

In another variant, the first and second apparatus are substantially co-located within a common, substantially portable device, and the act of operating according to one of a plurality of operational protocols comprises selecting one of a plurality of operating modes associated within at least one of the first and second communications apparatus.

In yet another variant, the first and second apparatus comprise WiFi and Bluetooth compliant air interfaces, respectively. The one of a plurality of protocols is selected based at least in part on the level of mutual interference between the WiFi and Bluetooth interfaces during operation of both.

In accordance with a second aspect of the invention, portable computerized apparatus is disclosed. In one embodiment, the apparatus comprises: a first wireless interface adapted to communicate wirelessly according to a first protocol; a second wireless interface adapted to communicate wirelessly according to a second protocol, the second interface being disposed proximate the first interface so that interference between the first and second interfaces occurs when both are in operation; and apparatus adapted to selectively implement one or more operating policies, the one or more policies reducing or compensating for the interference over that obtained when the one or more policies are not implemented.

In one variant, the apparatus adapted to implement comprises: a processor; and a computer program, the program comprising a plurality of instructions which, when executed on the processor, implement the one or more operating policies base don at least one input relating to antenna isolation associated with at least one of the first and second interfaces.

In another variant, the first interface comprises a WLAN interface, and the second interface comprises a short-range low-bandwidth interface, the first and second interfaces each operating within at least partly overlapping frequency bands.

In yet another variant, the selective implementation of the one or more policies comprises selecting the one or more policies based at least in part on measured antenna isolation.

In still a further variant, the selective implementation of the one or more policies comprises selecting the one or more policies based at least in part on a variable physical relationship between first and second antennas associated with the first and second interfaces, respectively.

In a third aspect of the invention, test apparatus adapted to evaluate the isolation of one or more antenna systems is disclosed. In one embodiment, the test apparatus comprises: a device under test, the device under test comprising first and second air interfaces; a test device, the test device comprising third and fourth air interfaces, the third and fourth interfaces operating according to the same protocols as the first and second interfaces, respectively, the third interface being adjustable in at least one aspect; and an attenuation apparatus adapted to simulate at least one antenna isolation level.

In one variant, the first and second air interfaces comprise WiFi and Bluetooth interfaces, respectively.

In a fourth aspect of the invention, a portable computerized device is disclosed. In one embodiment, the device comprises: a first wireless interface operating according to a first protocol; a second wireless interface operating according to a second protocol; a test apparatus adapted to test at least one parameter associated with the first and second interfaces and produce data relating thereto; and logic adapted to utilize the data to optimize at least one aspect of the operation of at least one of the first and second interfaces.

In a fifth aspect of the invention, a method of doing business is disclosed. In one variant, the method comprises: determining a required customer configuration for a device, the required configuration comprising at least two wireless interfaces; identifying a basis for evaluation of the operation of at least one of the at least two interfaces; evaluating the device configured according to the required configuration based at least in part on the basis; implementing one of a plurality of operational policies based at least in part on the act of evaluating; and providing the device in the required configuration and optimized therefor to the customer.

Other features and advantages of the present invention will immediately be recognized by persons of ordinary skill in the art with reference to the attached drawings and detailed description of exemplary embodiments as given below.

DETAILED DESCRIPTION OF THE INVENTION

Figure 1:
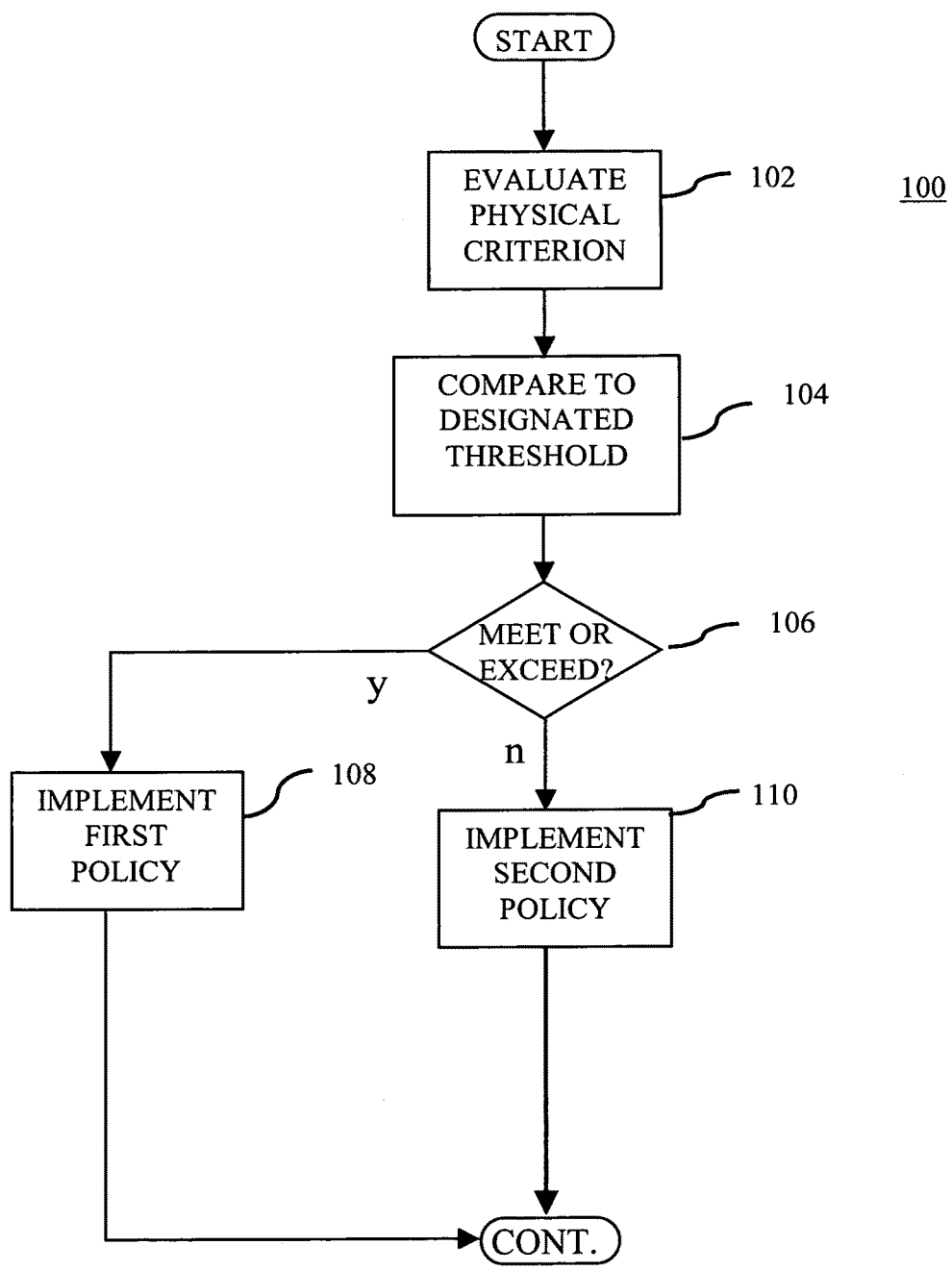
FIG. 1 is a logical flow diagram illustrating an exemplary embodiment of the generalized method for compensating for the effects of interference in accordance with the principles of the present invention.

As used herein, the terms "client device" and "end user device" include, but are not limited to, personal computers (PCs), such as for example an iMaC™, Mac Pro™, Mac Mini™ or MacBook™, and minicomputers, whether desktop, laptop, or otherwise, as well as mobile devices such as handheld computers, such as for example an iPhone™, PDAs, video cameras, set-top boxes, personal media devices (PMDs), such as for example an iPod™, or any combinations of the foregoing.

As used herein, the term "co-located" refers to two or more devices or components which are sufficiently physically proximate one another so as to cause at least some level of interference with the operation of at least one of the devices/components.

As used herein, the term "computer program" or "software" is meant to include any sequence or human or machine cognizable steps which perform a function. Such program may be rendered in virtually any programming language or environment including, for example, C/C++, Fortran, COBOL, PASCAL, assembly language, markup languages (e.g., HTML, SGML, XML, VoXML), and the like, as well as object-oriented environments such as the Common Object Request Broker Architecture (CORBA), Java™ (including J2ME, Java Beans, etc.), Binary Runtime Environment (BREW), and the like.

As used herein, the term "integrated circuit (IC)" refers to any type of device having any level of integration (including without limitation ULSI, VLSI, and LSI) and irrespective of process or base materials (including, without limitation Si, SiGe, CMOS and GaAs). ICs may include, for example, memory devices (e.g., DRAM, SRAM, DDRAM, EEPROM/Flash, ROM), digital processors, SoC devices, FPGAs, ASICs, ADCs, DACs, transceivers, memory controllers, and other devices, as well as any combinations thereof.

As used herein, the term "memory" includes any type of integrated circuit or other storage device adapted for storing digital data including, without limitation, ROM. PROM, EEPROM, DRAM, SDRAM, DDR/2 SDRAM, EDO/FPMS, RLDRAM, SRAM, "flash" memory (e.g., NAND/NOR), and PSRAM.

As used herein, the terms "microprocessor" and "digital processor" are meant generally to include all types of digital processing devices including, without limitation, digital signal processors (DSPs), reduced instruction set computers (RISC), general-purpose (CISC) processors, microprocessors, gate arrays (e.g., FPGAs), PLDs, reconfigurable compute fabrics (RCFs), array processors, secure microprocessors, and application-specific integrated circuits (ASICs). Such digital processors may be contained on a single unitary IC die, or distributed across multiple components.

As used herein, the terms "network" and "bearer network" refer generally to any type of data, telecommunications or other network including, without limitation, data networks (including MANs, PANs, WANs, LANs, WLANs, micronets, piconets, internets, and intranets), hybrid fiber coax (HFC) networks, satellite networks, cellular networks, and telco networks. Such networks or portions thereof may utilize any one or more different topologies (e.g., ring, bus, star, loop, etc.), transmission media (e.g., wired/RF cable, RF wireless, millimeter wave, optical, etc.) and/or communications or networking protocols (e.g., SONET, DOCSIS, IEEE Std. 802.3, 802.11, ATM, X.25, Frame Relay, 3GPP, 3GPP2, WAP, SIP, UDP, FTP, RTP/RTCP, H.323, etc.).

As used herein, the term "network interface" refers to any signal, data, or software interface with a component, network or process including, without limitation, those of the Firewire (e.g., FW400, FW800, etc.), USB (e.g., USB2), Ethernet (e.g., 10/100, 10/100/1000 (Gigabit Ethernet), 10-Gig-E, etc.), MoCA, Serial ATA (e.g., SATA, e-SATA, SATAII), Ultra-ATA/DMA, Coaxsys (e.g., TVnet™), radio frequency tuner (e.g., in-band or OOB, cable modem, etc.), WiFi (802.11a,b,g,n), WiMAX (802.16), PAN (802.15), or IrDA families.

As used herein, the term "wireless" means any wireless signal, data, communication, or other interface including without limitation Wi-Fi, Bluetooth, 3G, HSDPA/HSUPA, TDMA, CDMA (e.g., IS-95A, WCDMA, etc.), FHSS, DSSS, GSM, PAN/802.15, WiMAX (802.16), 802.20, narrowband/FDMA, OFDM, PCS/DCS, analog cellular, CDPD, satellite systems, millimeter wave or microwave systems, acoustic, and infrared (i.e., IrDA).

Overview

The present invention provides, inter alia, methods and apparatus for compensating for the effects of electromagnetic interference (EMI) between co-located or proximate wireless devices (e.g., air interfaces) in a client or user device such as a mobile computer or smartphone. In one aspect of the present invention, the methods of compensating for the effects of interference between proximate wireless devices is dependent upon one or more operational criteria, such as for example antenna isolation. Depending on the status of the operational criteria in the system, differing operating rules are implemented so as to achieve the goal of providing the user of the client device with the best overall use experience possible.

In more severe cases, such as when interference between the co-located wireless technologies is relatively high, an optional "closed-loop" approach may be employed which includes the access point or gateway in the optimization process. This approach enhances data throughput on the differing wireless implementations by, inter alia, implementing priority-based time sharing between the respective wireless devices. This closed-loop solution can then be enabled or disabled based on the status of the operating criteria. Priorities can be assigned for example based on the type of packet or data to be sent, application priorities, user priorities and/or wireless device usage. Further, because the system is a closed-loop configuration, other parameters can be adjusted as well (such as e.g., transmitter power level, etc.) within the context of one another in order to further mitigate the effects of interference and enhance user experience with the client device.

Advantageously, the flexibility of the present invention also allows for the application to multiple different hardware and software configurations, since inter alia the optimization process is not tied to any one set of assumptions or physical constraints. Users can reconfigure their hardware (e.g., swap modules or antennae), and the dynamic and optionally automatic optimization process can then in one embodiment reassess the parameters of interest (e.g., isolation), and determine whether further adjustments are necessary.

In another aspect, the present invention may be employed on a global perspective; i.e., to select the best one or more operational policies/configurations to select based on the type of application. For instance, two air interfaces installed within a laptop computer of a particular configuration may require different policies/treatment than the same two air interfaces installed in a mobile user smartphone.

In one exemplary implementation, the methods and apparatus of the present invention deliver a highly desirable user experience (including substantial freedom from the effects of interference as previously described) by inter alia prioritizing all the WLAN and Bluetooth events based on indigenous device hardware and software needs. The exemplary solution is also highly flexible, as it provides different coexistence solutions for different antenna isolation values and environments. The functions described herein can also be implemented in e.g., a completely automatic, semi-automatic (e.g., user confirmation), or completely manual fashion depending on device manufacturer and user preferences.

The exemplary implementation provides a seamless user experience, allowing for completely invisible dynamic optimization by the device (or alternatively any degree of user/developer involvement that is desired in the optimization process, such as via a software interface).

In one variant, the invention also advantageously allows for dynamic power control/management between two or more wireless modules via a management interface which permits information to flow between the modules regarding interference, state, power, etc.

DETAILED DESCRIPTION OF EXEMPLARY EMBODIMENTS

Exemplary embodiments of the present invention are now described in detail. While these embodiments are primarily discussed in the context of Bluetooth and WLAN coexistence, it will be recognized by those of ordinary skill that the present invention is not limited to any two particular wireless protocols. In fact, the principles discussed herein are equally applicable to any number of wireless protocols which at least partly share frequency bands, and with which antenna isolation problems occur as a result of the two wireless protocol implementations being substantially co-located. For example, Apple TV™, a digital media receiver sold and marketed by the Assignee hereof, utilizes WLAN 802.11a/b/g/n and wireless USB. WLAN and wireless USB share the same ISM bands, and hence could conceivably benefit from the coexistence solutions discussed subsequently herein.

Moreover, while discussed primarily in the context of a basic two-protocol topology, it is recognized that other topologies (e.g., three-protocol, etc.) may be used consistent with the invention. For instance, WLAN, Bluetooth, and wireless USB could conceivably be used simultaneously and could benefit from the coexistence solutions discussed subsequently herein. Such a system might integrate WLAN, Bluetooth and wireless USB, WLAN for network, Bluetooth for PAN, including FTP, headphone/headset, and wireless USB for remote controller, HID (mouse and KB).

Additionally, it will be appreciated that the methods and apparatus of the invention may be applied to situations where more than two interfaces are co-located or proximate, but not necessarily operated all at the same time. For instance, in one variant of the invention, a user device is configured with three (3) distinct air interfaces (labeled "A", "B" and "C" for purposes of this discussion), yet the most common operating mode for the user device is where only two of the three interfaces are operated simultaneously. Depending on which of the three interfaces are being operated at a given time, the policies or rules applied may be different. For example, interface A might have significant mutual interference issues with interface B, but not with interface C. Similarly, interface C might have significant issues with interface B, but not A. So, the present invention explicitly contemplates the dynamic selection and application of one or more operating policies or configurations based on a determination of which interfaces are operating at a given time.

Methods

Referring now to FIG. 1, one exemplary embodiment of the generalized method of compensating for the effects of interference between multiple air interfaces is disclosed. As shown in FIG. 1, the first step 102 of the method 100 comprises evaluating one or more physical criteria relating to the air interfaces. In one embodiment, this criterion comprises antenna isolation (in decibels, or dB), although other/additional criteria may be evaluated as well, such as without limitation: (i) transmitter power (e.g., for one or multiple modules), (ii) receiver sensitivity, (iii) dynamic range, (iv) duty cycle, (v) the use of adaptive frequency hopping (AFH) or not, and so forth.

Next, per step 104, the measured criterion (or criteria) are compared to a predetermined threshold value (or respective values for each of the multiple criteria where used). This comparison may be purely numeric in nature; e.g., measured value A is greater than, less than, or equal to its relevant threshold. This can be accomplished for example using a simple algorithm. Alternatively, the variables or values may be evaluated by a human to identify any additional artifacts or information. For instance, a series of measurements of isolation between two antennas under varying external/environmental conditions may yield more information that just a direct "greater than/equal to/less than" type comparison, since the changes in the measured isolation values might correlate to one or more external/environmental variables. The variables used may also be fuzzy in nature (e.g., "high", "medium", "low" or the like). Various different approaches to assessing the relationship between one or more measured values and their relevant acceptance/decision criteria will be recognized by those of ordinary skill given the present disclosure, and accordingly are not described further herein.

If the relevant threshold is met or exceeded (depending on the desired decision logic) per step 106, a first operational policy is implemented per step 108. This policy may comprise for example (i) enabling or disabling different types of operational modes or features (e.g., adaptive frequency hopping; see discussion of FIG. 1A below), (ii) restricting operations to certain types of situations, applications or environments, (iii) coordinating the operation of the two or more potentially interfering air interfaces, or yet other options.

Figure 1A:
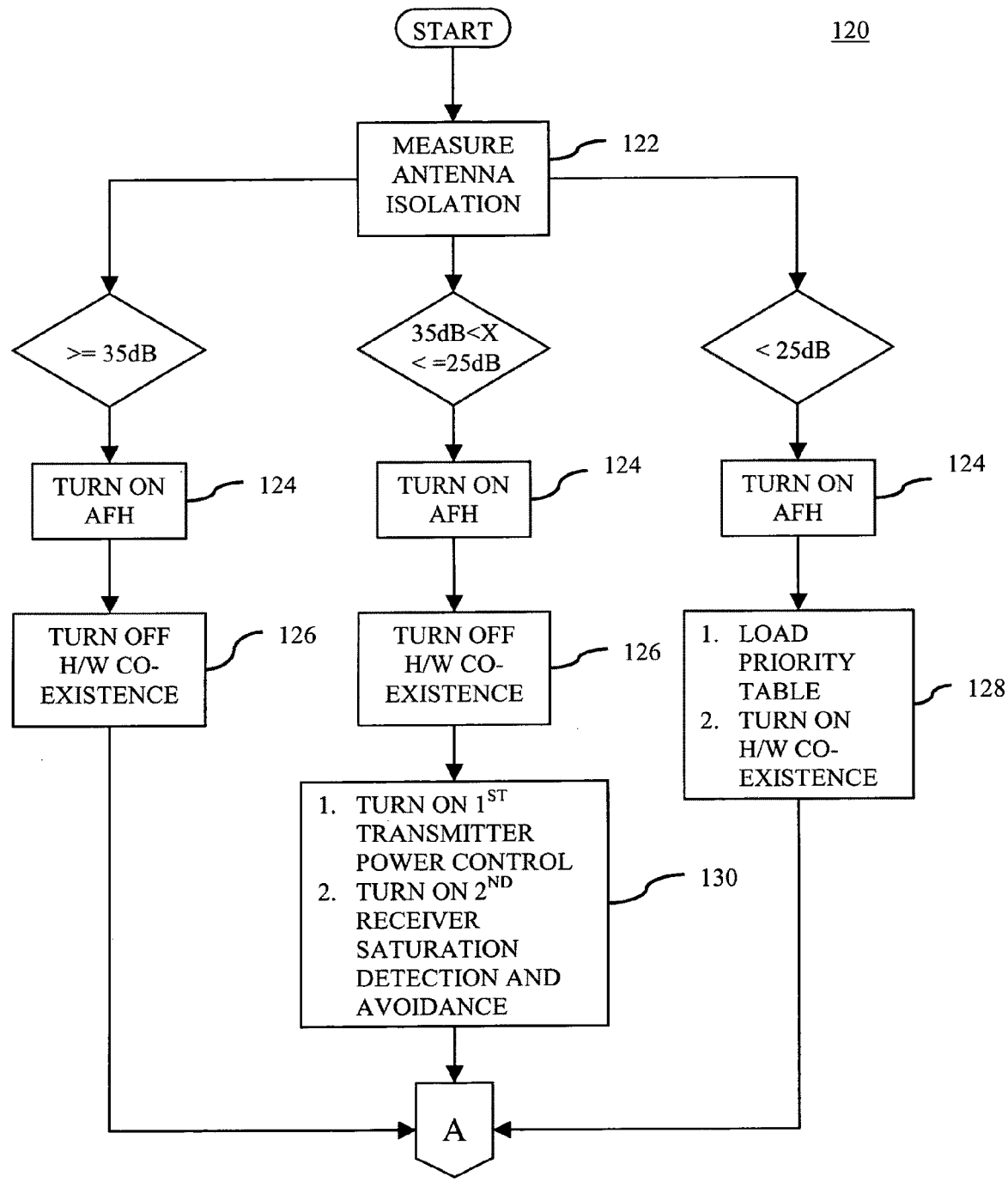
FIG. 1A is a logical flow diagram illustrating an exemplary implementation of the method of FIG. 1, in the context of a WLAN/Bluetooth solution.
Figure 1A:
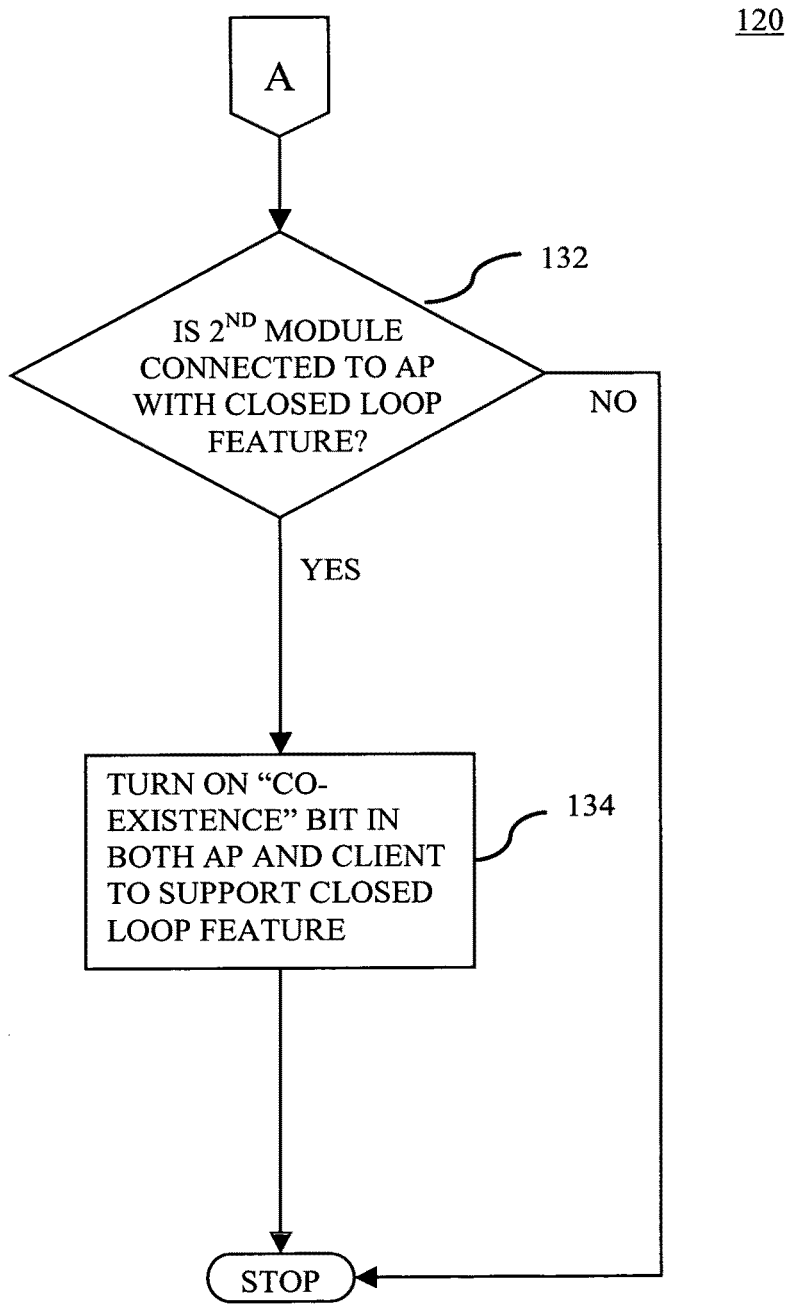

Referring now to FIG. 1A, one exemplary implementation of the methodology 100 of FIG. 1 for compensating for the effects of interference in a system having coexisting air interfaces is described. In one embodiment, the methodology is described in the context of a system which has a proximally located Bluetooth and WLAN implementation. As is well known, existing implementations of Bluetooth and WLAN (i.e. 802.11b/g/n) operate in the 2.4-2.8 GHz frequency range.

The present methodology mitigates or compensates for the effects of interference by operating according to a set of rules which are based on a certain operating criteria of the system. In the illustrated embodiment, the relevant operating criterion comprises the antenna isolation between the physically proximate WLAN and Bluetooth implementations. In step 122 of FIG. 1A, the antenna isolation in the system is measured in order to better understand the level of severity of communication interference. The antenna isolation measured may either be static or dynamic, depending on the nature of the system. In static systems, the antenna isolation can be measured once during product development and the severity of system level interference can be determined without necessitating repeated antenna isolation measurements. This is particularly useful as systems incorporating the present methodology need not implement antenna isolation measurement apparatus within the systems itself or otherwise implement more complex mechanisms associated with handling a dynamic system.

Alternatively, the antenna isolation in the system may be dynamic thereby: (1) requiring periodic measurements of antenna isolation in the system in order to dynamically determine the operating rules of the system used to compensate for the effects of interference; or (2) requiring antenna isolation measurements for each of the dynamic cases during product development in order to determine the operating rules of the system in each of those cases; or (3) estimating antenna isolation measurements for each of the dynamic cases based on a limited subset of antenna isolation measurements during development of the system.

In one embodiment, such a dynamic system may comprise a laptop computer which implements both a Bluetooth and WLAN module within the laptop itself. In this embodiment, the Bluetooth and WLAN modules may have a variable geometry; e.g., the Bluetooth module may be situated in the movable monitor/display portion of the device, while the WLAN module may be implemented in the base of the laptop. Hence, depending on the relative positioning of the modules (i.e., due to the relative positioning of the monitor with respect to the base on the laptop), different isolation values may be obtained for the system. During product development of the laptop, antenna isolation measurements may be taken with the monitor positioned at a plurality of different positions with respect to the base of the laptop. These antenna isolation measurements can then be stored for example in a table in memory, or via another data storage approach. During operation, the relative positioning of the laptop monitor can be determined using any number of well-known means (e.g., a sensor which determines the relative angle between the monitor portion and base, user input, etc.), and the appropriate entry read from the table.

In another variant, the foregoing laptop computer may be configured and optimized for "lid open" (i.e., display portion folded open) or "lid closed" (display portion folded down and locked to base) situations, such that the optimization algorithm will detect one of these two conditions, and apply the appropriate policy dynamically.

Dynamic corrections may also conceivably be necessitated by other factors, including for example: (i) the placement of the device with respect to other nearby radiators in the relevant frequency range (e.g., many microwave ovens operate at about 2.4 GHz, and hence may raise the ambient background noise level so that greater isolation between the two antenna of interest is desired); or (ii) the use of other equipment within the device itself that might affect the isolation of the two air interfaces in question (e.g., a third air interface that potentially interferes with one of the two first interfaces, other sources of electromagnetic radiation or noise, etc.).

Regardless of whether the system is static or dynamic, the measured antenna isolation is then classified based on the observed value(s). For instance, in the embodiment illustrated in FIG. 1A, the measured antenna isolation is classified into three (3) distinct groups. These groups comprise: (1) an antenna isolation of greater then or equal to 35 dB; (2) an antenna isolation of between 35 dB and 25 dB; and (3) an antenna isolation of less than 25 dB. It is however appreciated that more or less antenna isolation classifications can be chosen with the groupings presented herein merely being exemplary for the WLAN and Bluetooth protocols.

Moreover, the selected threshold values (i.e., 25 and 35 dB) may be changed, and even made dynamic or variable themselves, such as being dependent on a given operational mode, application, or environmental condition. The threshold values may also be of different measurements or units (e.g., dBi, dBm, etc.).

In the first classification of FIG. 1A (i.e., where the WLAN and Bluetooth antenna isolation is 35 dB or greater), the coexistence between the WLAN and Bluetooth modules is handled in large part with Bluetooth's existing Adaptive Frequency Hopping (AFH) feature. The AFH feature in Bluetooth mitigates interference by avoiding the use of crowded frequencies during the Bluetooth frequency hopping sequence as part of its FHSS access technique, which in this case are those main frequency bands occupied by the WLAN module. Therefore, in step 124, the AFH feature in Bluetooth is turned on via a software process by sending an AFH command to the Bluetooth module. In another variation, this AFH command is only sent when both the WLAN module and Bluetooth module are operating simultaneously. In yet another variation, further variables are introduced into the decision making process for whether or not AFH should be activated or not. These variables could include, for example, the applications being utilized on the respective WLAN and Bluetooth modules with the AFH decision being made based on a determination of whether or not AFH is needed so as to provide the optimal user experience.

Quality of service or other actual performance feedback measurements or inputs may be used in the decision process of FIG. 1A as well; for example, if both potentially interfering interfaces are being operated, and one (or both) are actually experiencing a degradation of service or performance (e.g., lost packets, high incidence of retransmission requests, BER higher than a prescribed amount, etc.), then more aggressive interference mitigation policies can be invoked.

Next, at step 126, hardware co-existence or similar indigenous function (if present) is turned off. For example, in the exemplary context of WLAN and Bluetooth modules, the hardware coexistence function can be turned off by a command to the WLAN module, such as "wl btc_mode 0". When co-existence is turned off, no communication or arbitration/suppression functionality between the two modules is employed. It will be recognized that the foregoing concept may be employed unidirectionally (e.g., one module receiving information from another, and adjusting its behavior, or the behavior of an arbitration function accordingly, such as a "master/slave" approach), bi-directionally (i.e., two or more modules passing information to the other(s)), or in yet other configurations that will be appreciated by those of ordinary skill in the art.

Next, at step 132, if closed-loop functionality is to be used, it is optionally determined whether or not the WLAN Access Point (AP) to which the WLAN module is connected supports the "closed loop" feature discussed subsequently herein. If so, the AP is sent a request to keep the data rate as high as possible at step 134. In one embodiment, this is accomplished by turning on a "coexistence" bit in both the AP and the client device to support the aforementioned closed loop feature, although any number of other approaches may be used, such as e.g., generating and sending a separate message, causing the device to read the contents of a control register, etc.

In the second classification, i.e., where the WLAN and Bluetooth antenna isolation is between 35 dB and 25 dB, the interference mitigation is accomplished in a fashion somewhat similar to the first classification previously described. The exemplary AFH feature in Bluetooth is activated as discussed previously above (step 124). In an alternative embodiment, it may be desirable to extend the bandwidth available to the AFH feature so as to further compensate for interference between the Bluetooth and WLAN modules.

Next, at step 126, hardware co-existence or similar functionality is turned off as previously discussed.

At step 130 the transmitter power control for Bluetooth is turned on and the Transmitter (Tx) power is adjusted (e.g., reduced) if necessary to mitigate interference. Similarly power control for the WLAN Transmitter (Tx) can be turned on and the Tx power adjusted if necessary. In addition, the WLAN module optionally turns on its receiver saturation detection and avoidance feature to further compensate for the interference. For example, in one variant, a power level table is stored in the device memory, and the optimization application can send down a command to establish a desired power level so as to mitigate/avoid saturation. The Bluetooth module for example may be configured with a software-controlled power output; if the WLAN receiver detects an undesirable power from Bluetooth module (such as via its receiver portion of its transceiver), the Bluetooth transmitter can be reduced in power via the software control.

At step 132, a determination is made to determine whether or not the WLAN AP connected to the WLAN module supports the closed loop feature; if so, the AP is instructed to keep the data rate as high as possible. In one embodiment, this is accomplished as discussed above by turning on a coexistence bit in both the client device and the AP or other such means.

In the third classification of FIG. 1A (i.e., where the WLAN and Bluetooth antenna isolation is less than 25 dB), more extensive measures need to be implemented in order to compensate for the significant amount of interference occurring between the WLAN and Bluetooth modules. At step 124, the Bluetooth AFH is again turned on so as to avoid use of crowded frequency bands. This is accomplished as discussed above.

In addition, and especially in cases where the relevant client device is operating under battery power, an aggressive utilization of a power saving function (e.g., the WLAN power saving mode (PSM)) is desirable. Basically, the exemplary WLAN PSM saves power by turning off the radios completely, and only implementing a wakeup for the beacons sent by the access point. A result of utilizing WLAN PSM is that interference is mitigated due to the periodic nature of turning off the radios and subsequently waking up in order to receive beacon signals from the AP. However, using PSM creates latency (especially if the wakeup periods have been configured for relatively long durations of time), and hence overaggressive use of PSM could detrimentally affect user experience. Therefore, the exemplary PSM or other such mechanism should be configured so as to mitigate interference while at the same time not significantly affecting user experience. The user may also be given an opportunity to provide input to this trade-off (such as via a GUI menu, icon, slider, etc.); e.g., where they desire very aggressive power conservation, and are willing to put up with some latency, or vice versa, they can adjust one or more settings to an appropriate value.

At step 128, a hardware coexistence signaling solution is implemented so as to provide "packet traffic arbitration" between the data packets sent from the Bluetooth and WLAN modules. In one embodiment, this arbitration function is accomplished by establishing and/or loading a priority table or other data structure into the client device. This priority table is then utilized to arbitrate the packets sent by both the Bluetooth and WLAN modules in terms of a predefined importance.

In one exemplary embodiment, the priority table is generated so as to favor the transmission of WLAN packets (all) over Bluetooth packets; however it is recognized that virtually any priority scheme may be implemented consistent with the invention. Further, priority need not be statically implemented; i.e. it may in certain cases be desirable to implement a priority table scheme which is dynamically variant, such as one that takes into account the relative level of activity of the WLAN and Bluetooth module, and adjusts the priority table accordingly.

Certain types of activities within the WLAN and Bluetooth modules may also be individually prioritized with respect to other activities within the same or different module. For example, functions requiring Quality of Service (QoS) in either module may be prioritized over those which do not have such requirements.

In another embodiment, the order of importance of the data packets of both the Bluetooth and WLAN modules is ordered as follows. WLAN beacon and ACK packets are given the highest order of importance during packet traffic arbitration. WLAN beacon and ACK packets are important inter alia, because it would be undesirable for the AP to reduce modulation as a result of missing ACK packets, etc. thus further reducing the WLAN throughput. Bluetooth link establishment packets along with sniff and inquiry packets are given the next highest level of importance, along with Human Interface Device (HID) packets for devices such as for a mouse and/or keyboard. Bluetooth stereo audio packets (A2DP) are given the next highest level of importance during packet traffic arbitration, followed by WLAN data packets, and finally Bluetooth data packets.

In an alternative embodiment, the priority for WLAN and Bluetooth events are based on usage cases, and would further emphasize Bluetooth HID and Bluetooth stereo (A2DP) packets as high priority items. Under this scheme however, one system may become rejected for a duration that is unacceptable (due to its low priority), and hence in certain embodiments it may be desirable to implement priority inversing capability so that the low priority events will increase in priority temporarily, thus receiving the necessary bandwidth.

Also part of step 128 in the exemplary embodiment of FIG. 1A, hardware co-existence or similar functionality is turned off as previously described.

In some embodiments, the Bluetooth stereo quality (i.e. Bluetooth Advanced Audio Distribution Profile "A2DP") can be reduced in order to improve the mitigation of interference between the WLAN and Bluetooth modules. In one variant, this is accomplished by utilizing an audio control utility that adjusts the audio quality to balance the WLAN and Bluetooth workload. This however would only be applicable where the particular Bluetooth implementation utilizes A2DP.

At step 132, the client device determines whether or not the relevant WLAN AP comprises a closed-loop feature of the type previously described herein and if so, the data rate for the AP is kept as high as possible. In one embodiment, this is accomplished as discussed above by turning on a coexistence bit in both the client device and the AP. As a general rule of thumb, it has been demonstrated that under the above mentioned classification scheme involving packet traffic arbitration, the average WLAN and BT throughput will be around 30-40% (each) of the stand-alone throughput, although these values may vary based on a number of different factors. The throughput is not 50%, as the time-sharing implementation has overhead associated with it as it switches between the WLAN and Bluetooth radios.

Apparatus

Figure 2:
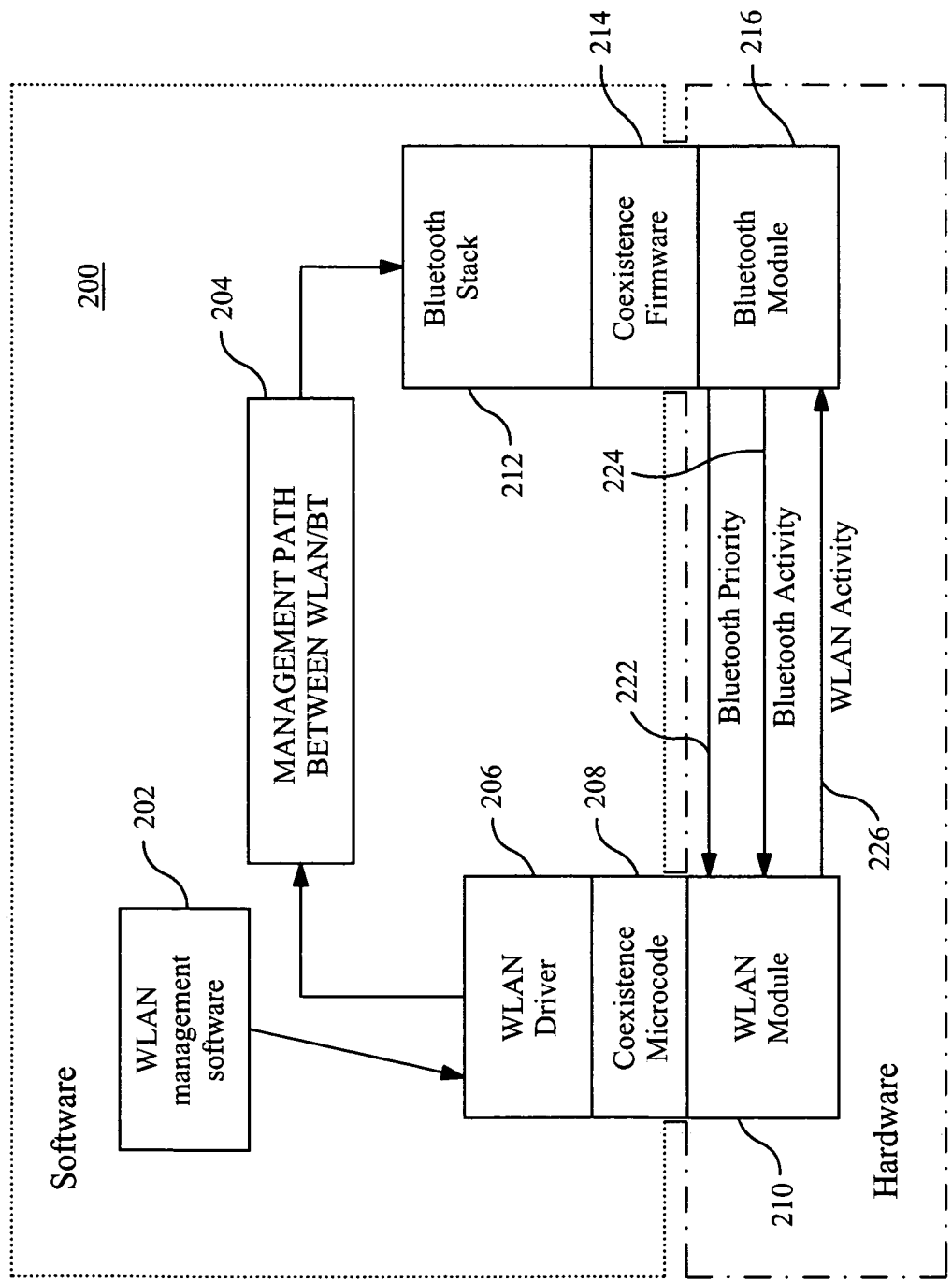
FIG. 2 is a functional block diagram illustrating an exemplary WLAN/Bluetooth enabled apparatus utilizing interference mitigation.

Referring now to FIG. 2, an exemplary apparatus 200 implementing WLAN/Bluetooth coexistence features is shown and described in detail. The apparatus 200 of FIG. 2 will generally be implemented within a single client device (e.g., laptop computer, smartphone, etc.) such that the WLAN module 210 and the Bluetooth module 216 are substantially co-located with one another, thereby introducing system interference as a result of poor antenna isolation. However, it will be recognized that the different modules may also reside in different physical devices which themselves are proximate to one another.

The apparatus 200 shown in FIG. 2 comprises combined software 220 and hardware 230 elements which together compensate for the interference caused by having both the air interfaces (e.g., WLAN module 210 and Bluetooth module 216) operating in close spatial proximity to one another. The software portion 220 of the apparatus 200 comprises WLAN management software 202, a WLAN driver 206, and coexistence microcode 208 for WLAN, as well as a Bluetooth stack 212, and coexistence firmware 214 for Bluetooth. A management path 204 between the software portions of the WLAN and Bluetooth portions of the system 200 is also provided. In one variant, the aforementioned management path 204 comprises a software interface (e.g., API) of the type well known in the software arts, although other approaches may be sued as well.

The WLAN management software 202 can handle a plurality of WLAN management functions such as, e.g. implementing a power saving mode (PSM) for the WLAN module 210 of the type previously described herein. The WLAN driver 206 is in communication with WLAN management software 202. As is well known, the WLAN driver 206 acts as a communication interface between higher level computer processes (such as the WLAN management software 202) with the WLAN hardware. The WLAN module 210 itself acts as the physical hardware necessary to implement the WLAN functionality.

On the Bluetooth side of the illustrated apparatus, the Bluetooth software stack 212 comprises an implementation of the Bluetooth protocol (see, e.g., Bluetooth Core Specification v2.1+EDR dated Jul. 26, 2007 {Bluetooth SIG}, incorporated herein by reference in its entirety) allowing flexible implementation of a plurality of different Bluetooth profiles. These profiles can include for example software for a Bluetooth enabled headset, or for a Bluetooth enabled I/O device such as a keyboard or mouse; see, e.g., Bluetooth Advanced Audio Distribution Profile 1.2 dated 16-Apr.-2007; Bluetooth Audio/Video Remote Control Profile 1.3 16-Apr.-2007; Bluetooth Basic Imaging Profile (BIP) 25Jul.-2003; Bluetooth Basic Printing Profile (BPP) 1.2 27-Apr.-2006; Bluetooth Common ISDN Access Profile (CIP) 16-Nov.-2002; Bluetooth Cordless Telephony Profile (CTP) 22-Feb.-2001; and Bluetooth Device Identification Profile (DI) 1.3 26-Jul.-2007, each of the foregoing incorporated herein by reference in its entirety).

The Bluetooth stack 212 is further in communication with coexistence firmware 214 which is communicates with the Bluetooth module 216. The Bluetooth module 216 further comprises the Bluetooth radio hardware.

Another feature of the apparatus 200 of FIG. 2 is the software communications management path 204 between WLAN and Bluetooth. This is significant in that it permits the implementation of a closed-loop solution between the WLAN module 210 and the Bluetooth module 216. In the illustrated embodiment, this management path 204 permits Bluetooth to read the WLAN channel as well as permit management software to send an AFH command to the Bluetooth module 216. While the present embodiment illustrates a one-way communications path between WLAN and Bluetooth, it is further envisioned that in some embodiments it may be desirable to have this software communications path 204 be bi-directional. Moreover, other types of management inputs are envisioned, including for example inputs as to the status of other modules or processes within the host device.

In terms of a hardware communications path between the WLAN module 210 and the Bluetooth module 216, FIG. 2 illustrates a 3-channel (e.g., 3-wire) solution. The first communications path 222 communicates Bluetooth priority information to the WLAN module 210. The second communications path 224 communicates Bluetooth activity information to the WLAN module while the third communications path 226 transmits WLAN activity information to the Bluetooth module. These signals are generated based on applications when the WLAN and/or Bluetooth modules are active, including when WLAN or Bluetooth activity are high. For example, information exchanged between the modules might relate to priority, activity (or lack thereof), Tx or Rx parameters, and so on.

These three communications paths are utilized to, inter alia, facilitate applying packet traffic arbitration between WLAN and Bluetooth so that each respective module can determine which packets contain the higher priority. It should further be noted that these three communications paths can, in some embodiments, be enabled/disabled based on antenna isolation of the system.

Also, while a 3-channel solution is presently illustrated, it is contemplated that other solutions could readily achieve the stated objectives of these communications paths. For instance, a two-wire solution could readily be implemented by e.g. maintaining a Bluetooth activity communications path and a WLAN activity communications path. Priority based information can be maintained within the respective WLAN and Bluetooth solutions, thereby obviating the need for a separate communications path.

Additionally, a single channel could be used in a TDM (time division multiplexed), half-duplex, or other multiple access fashion in order to permit two- or more-way communication over a single or lesser number of physical channels.

Further, solutions having a greater number of physical channels could readily be implemented consistent with the principles of the present invention; for example, additional information could be passed between modules to further facilitate packet traffic arbitration or other functions such as control or status determination.

It will also be recognized that the aforementioned embodiment of the management path 204 comprises a software interface, which necessarily induces an appreciable latency as compared to an effectively real-time "signal path". Hence, the present invention contemplates the use of multiple information paths as required; i.e., a management path for commands or information which can tolerate some degree of latency, and a signal path for more instantaneous or real-time signal communications (the latter which may be effected for example using a single or multi-conductor bus, etc.).

Performance Test Apparatus

Figure 3:
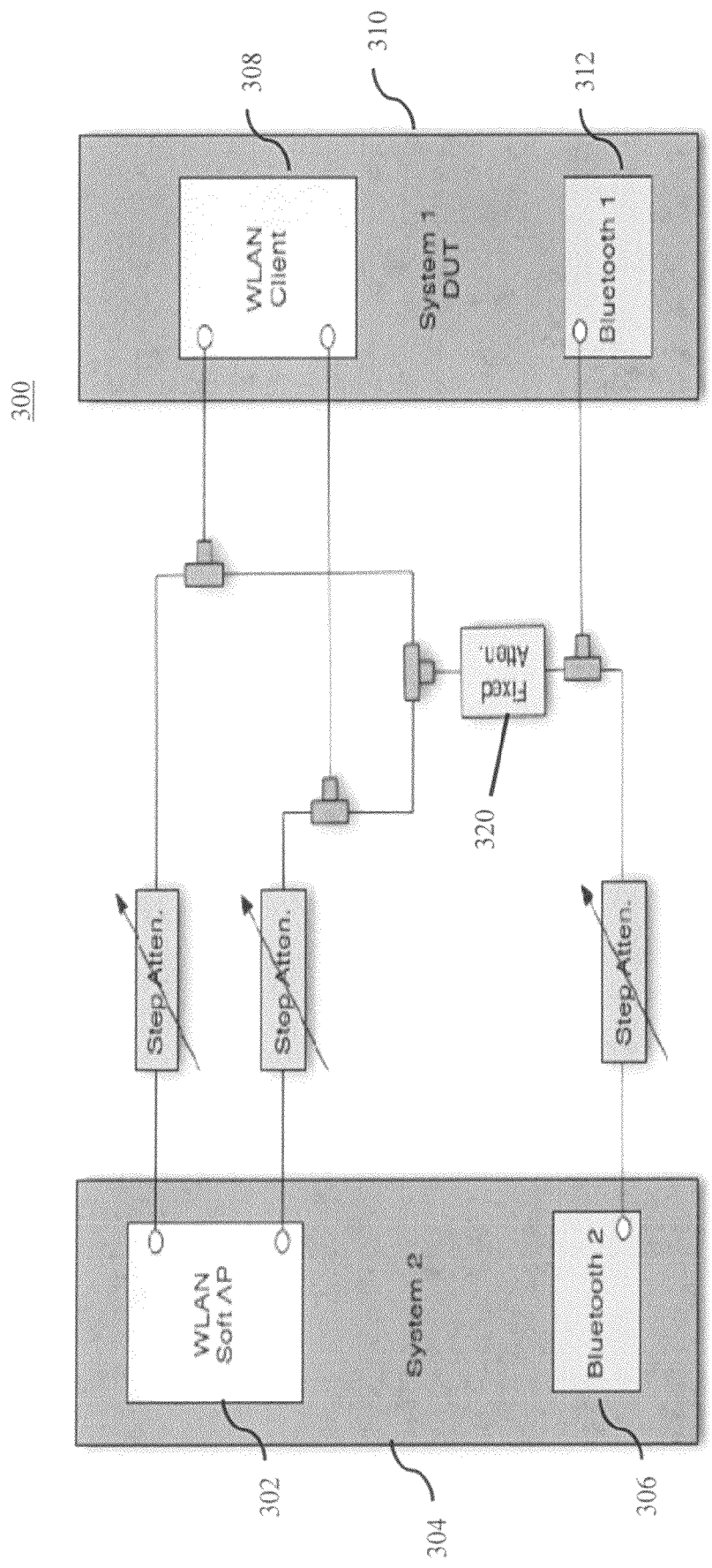
FIG. 3 is a functional block diagram illustrating an exemplary WLAN/Bluetooth antenna isolation test and evaluation apparatus.

Referring now to FIG. 3, one embodiment of exemplary WLAN/Bluetooth test apparatus 300 is shown and described in detail. This apparatus is used to simulate and evaluate antenna isolation in the case of two substantially co-located air interfaces (e.g., WLAN and Bluetooth).

The illustrated test apparatus 300 comprises a first system 310 having a device under test (DUT), and a second system 304. The first system 310 comprises in this example the WLAN client 308 and a Bluetooth implementation (e.g., module) 312, although other combinations may clearly be used consistent with the invention as previously described. The second system 304 comprises a WLAN "soft" AP 302 and a second Bluetooth implementation 306. The antenna isolation is simulated based on a fixed attenuator 320 located between the WLAN and Bluetooth modules, so that the test setting can be utilized for all antenna isolation classifications (e.g., greater then or equal to 35 dB, between 35 dB and 25 dB, and less than 25 dB in the context of the example of FIG. 1A). This test apparatus 300 advantageously produces results that are repeatable and duplicable.

Figure 4:
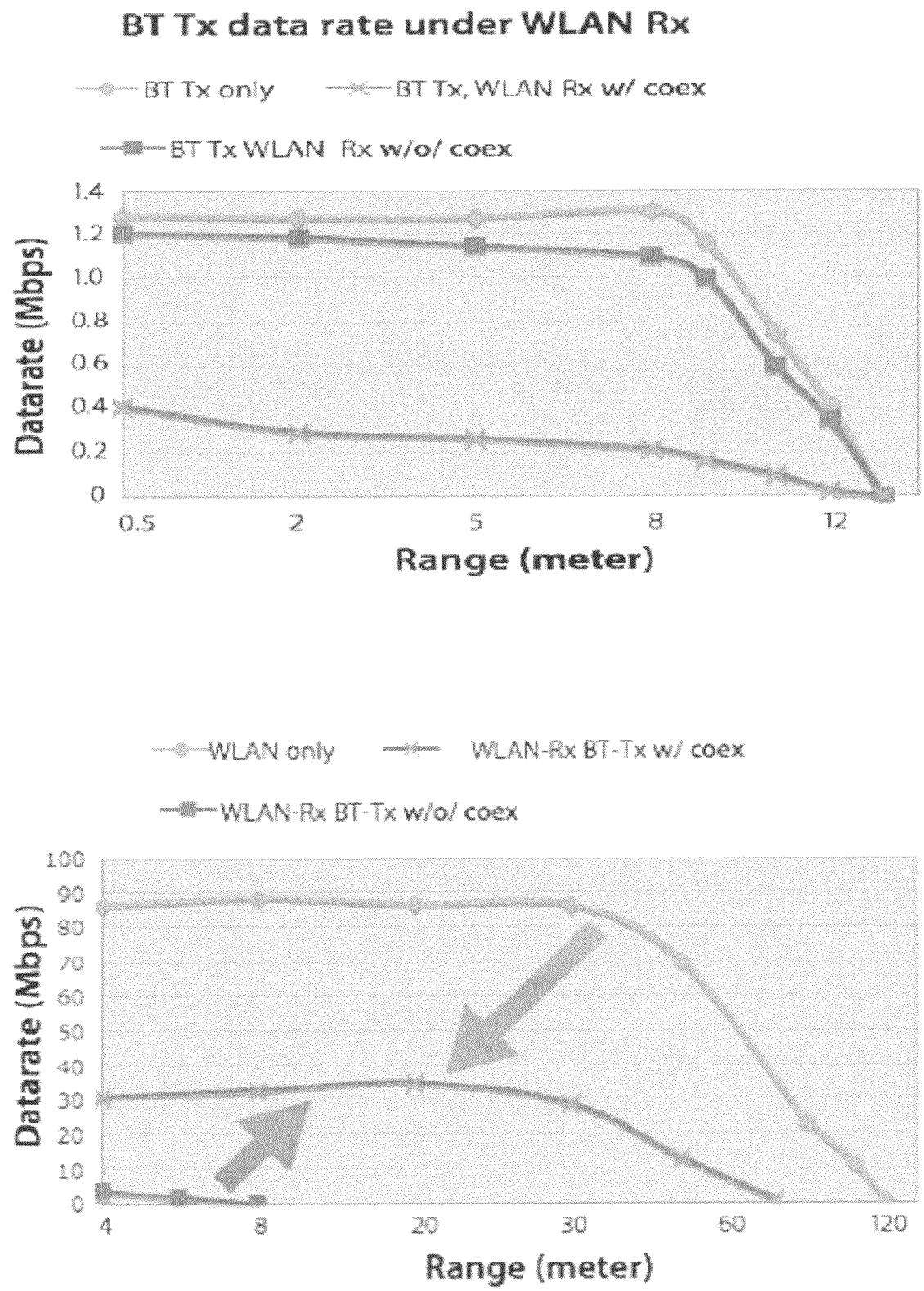
FIG. 4 is an exemplary illustration of data rate as a function of range in a multi-interface system where the WLAN module is receiving and the Bluetooth module is transmitting.

Referring now to FIG. 4, exemplary test results illustrating WLAN reception and Bluetooth transmission with an antenna isolation of 15 dB are shown and discussed in detail. FIG. 4 demonstrates that when the WLAN interface is receiving data (such as downloading video) and the Bluetooth interface is transmitting (such as sending files to a Bluetooth printer, syncing with a PDA, etc.) that even with Bluetooth AFH enabled, the Bluetooth transmitter severely cripples the ability for the WLAN to receive data. This is due in large part to the WLAN receiver getting saturated. In the present test case that has been illustrated the Bluetooth transmission power is 4 dBm and hence the Bluetooth interference introduced to the WLAN receiver is 4 dBm−15 dB=−11 dBm. However, FIG. 4 also illustrates that with the WLAN/Bluetooth hardware signaling enabled, and with WLAN and Bluetooth doing time sharing, the WLAN data rate improves from less than 1 Mbps to greater than 30 Mbps for its peak data rate.

Methods of Doing Business

In another aspect of the invention, methods of doing business relating to the aforementioned apparatus and operational methods are disclosed.

Figure 5A:
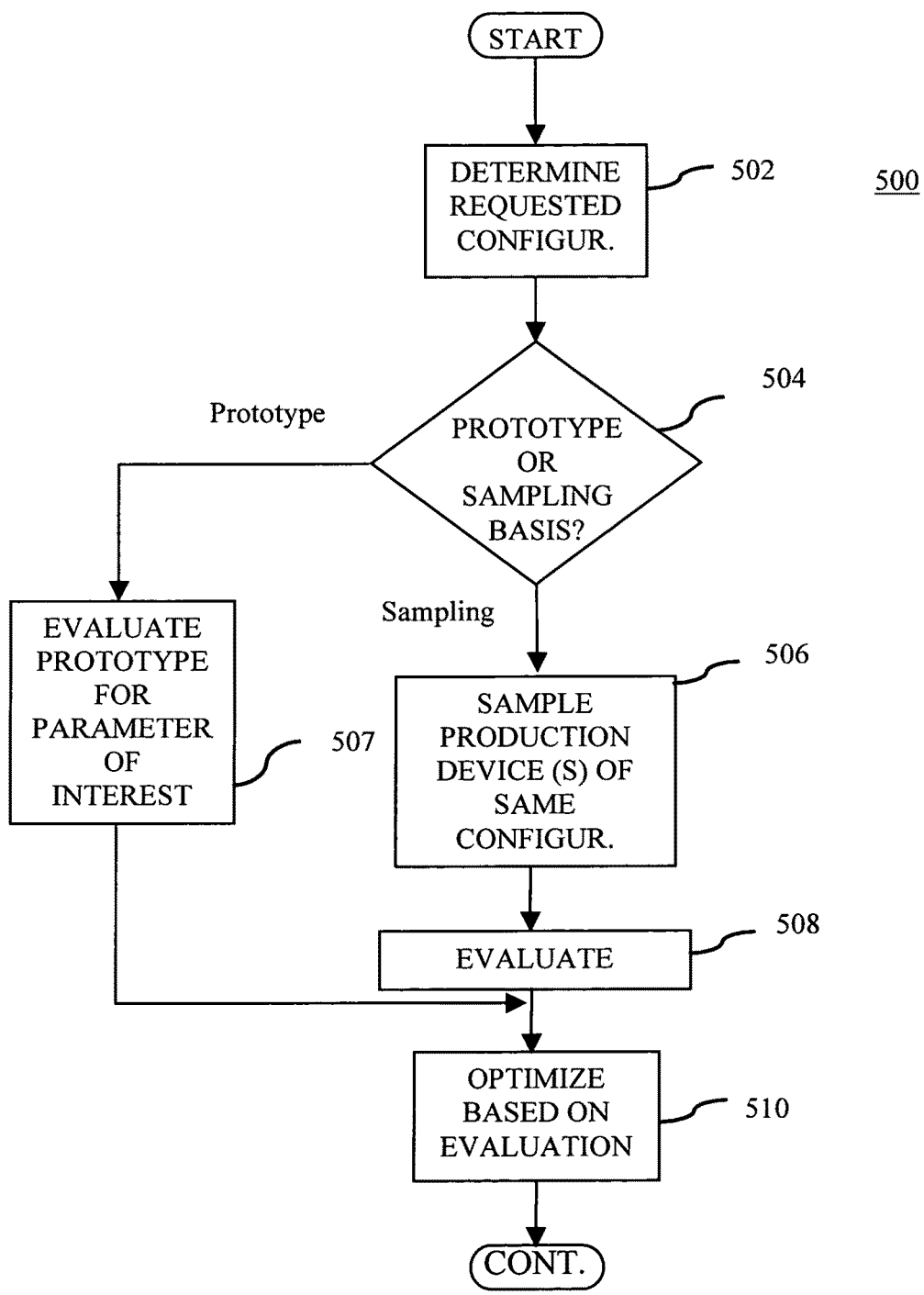
FIG. 5A is a logical flow diagram illustrating an exemplary embodiment of the business method of device optimization based on static configuration according to the invention.

In one embodiment, the method comprises providing (e.g., selling for consideration) portable computers such as laptops, PDAs, smartphones, or other client devices or services (e.g., the Apple TV™ set-top box and service provided by the Assignee hereof) that have been optimized based on their measured radio frequency interface characteristics; e.g., antenna isolation. Specifically, as shown in FIG. 5A, the client device configuration is determined per step 502, including selection of various options by a consumer. This may be accomplished for example via the Internet (e.g., using an on-line configuration interface or "wizard" which allows the customer to configure their prospective device according to any number of different options. The configured device is optimized according to for example the methodology of FIG. 1A based on its measured antenna isolation, and/or optionally any other parameters of interest as previously described herein. For "static" devices of the type previously described, this optimization can be accomplished per step 504 on: (i) a prototype basis, such as where a prototype device representative of the production run in that particular configuration is tested and optimized based on the actual measured antenna isolation values (e.g., using the test and evaluation apparatus of FIG. 3); and/or (ii) a per-unit or statistical sampling basis, such as where every production unit (or a statistically significant sampling thereof) is evaluated and optimized. See steps 506 through 510 of the exemplary method 500 of FIG. 5A. Since it is expected that very little if any variance in antenna isolation between two units of the same production configuration will exist, the prototype approach may typically be used with success for static units. However, as device configuration changes (e.g., different antenna form factors or interface modules, different options in terms of other internal components, etc., the results of prototype testing from one configuration may not be wholly applicable to another, and hence testing of a second prototype or sampled unit for the second configuration may be required.

In another variant, the particular type of environment in which the device will be predominantly used can be supplied by the requesting consumer, thereby allowing at least some degree of device-specific or customized evaluation and optimization. For instance, if the predominant use of the device will be in an open-air environment where multi-path interference, Rayleigh fading, or other such physical phenomena are not as significant, then the optimization applied may conceivably be different than that applied where the same unit was intended to be predominantly used in a high multi-path/high fade environment. Hence, the present invention contemplates in general the "tuning" of a particular device configuration for use in a particular environment.

In terms of dynamic configurations, such as the aforementioned laptop computer with movable display portion, the exemplary embodiment of the business method (See FIG. 5B) comprises first obtaining the required device configuration, such as that requested by the user via the aforementioned on-line "wizard", per step 522. Next, per step 524, the variations in device geometry or placement are evaluated to determine the possible range of different combinations of placement, etc. For example, in the case of the aforementioned laptop computer with variable geometry display and antenna disposed in the display portion, the range of motion of the display (which may be simply an arc traced from fully closed to fully opened, or yet more complex positions if the display is articulated around more than one axis) is determined. This range of motion is then divided into a set of discrete intervals, such as e.g., every 10 degrees of arc in the foregoing single-axis example. Then, the antenna isolation and/or other parameters of interest are evaluated at each discrete interval, and the results tabulated, plotted, or otherwise recorded in a useful format (which may include both machine- and human-readable forms). It may be the case that the measured parameter(s) is/are substantially arc-independent; e.g., isolation is always greater than a prescribed threshold such as 35 dB irrespective of display position. In such a case, the device can be "dumb"; i.e., no particular intelligence is required, since the display portion position is a logical "don't care". No position detection mechanism is required either for the same reason.

However, in cases where the parameter of interest (e.g., isolation) does vary significantly as a function of position, and the variation crosses one or more thresholds, then the aforementioned dynamic optimization methodology can be employed, whether in software, firmware and/or hardware as desired. For example, in one variant, the client device (laptop) includes an algorithm that receives input as to the sensed geometry (such as via an angular sensing mechanism for the display portion of the laptop) per step 526, and selects the appropriate optimization "branch" or policy for that setting, based on the stored table or other such data obtained during testing (step 528). When the display portion is moved, the sensing mechanism communicates this data to the algorithm, which then re-evaluates the optimization currently in place (step 530), and if not optimal, adjusts the optimization per step 532.

Figure 5B:
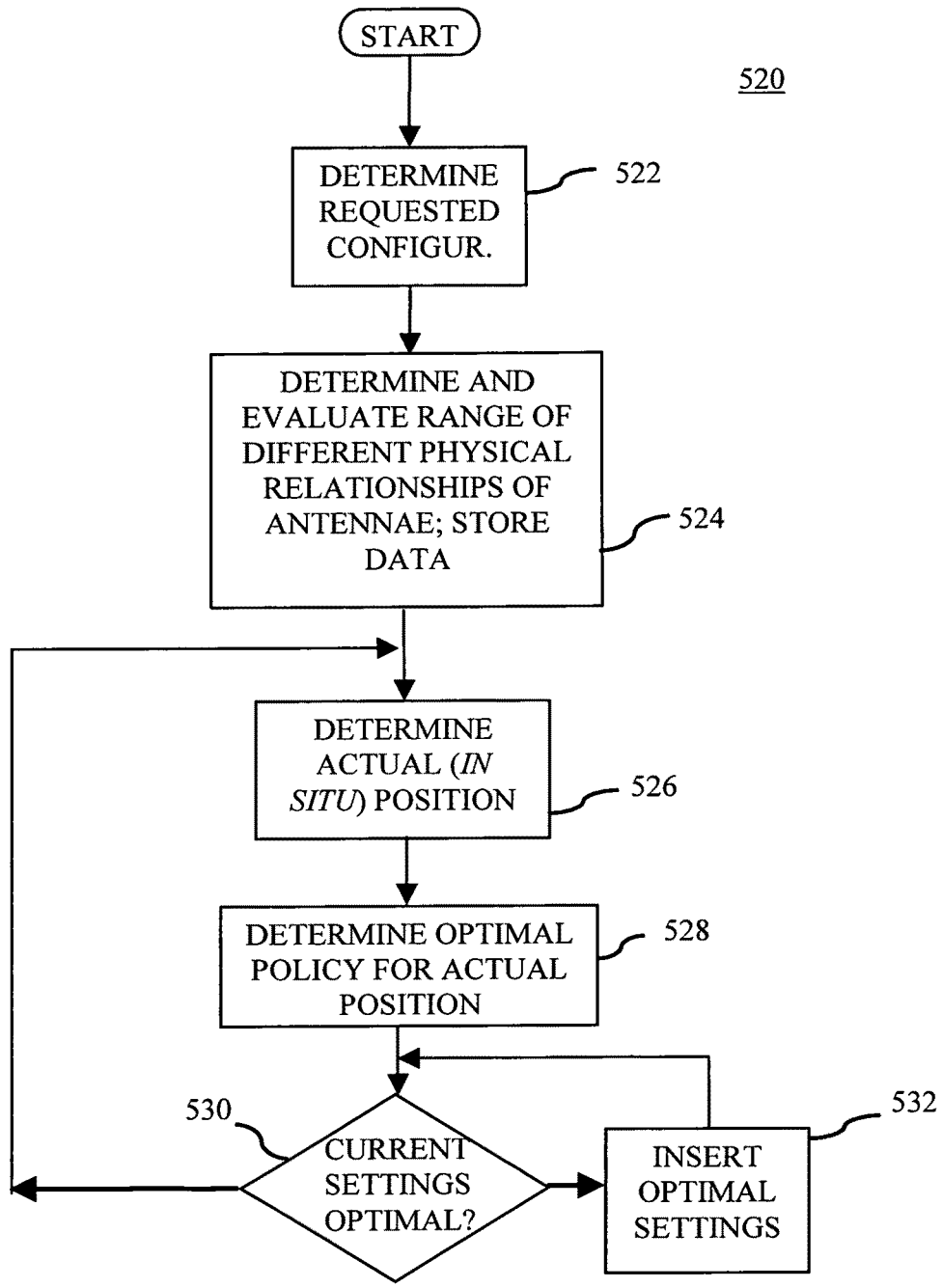
FIG. 5B is a logical flow diagram illustrating another embodiment of the business method of device optimization based on dynamic configuration according to the invention.
Figure 5C:
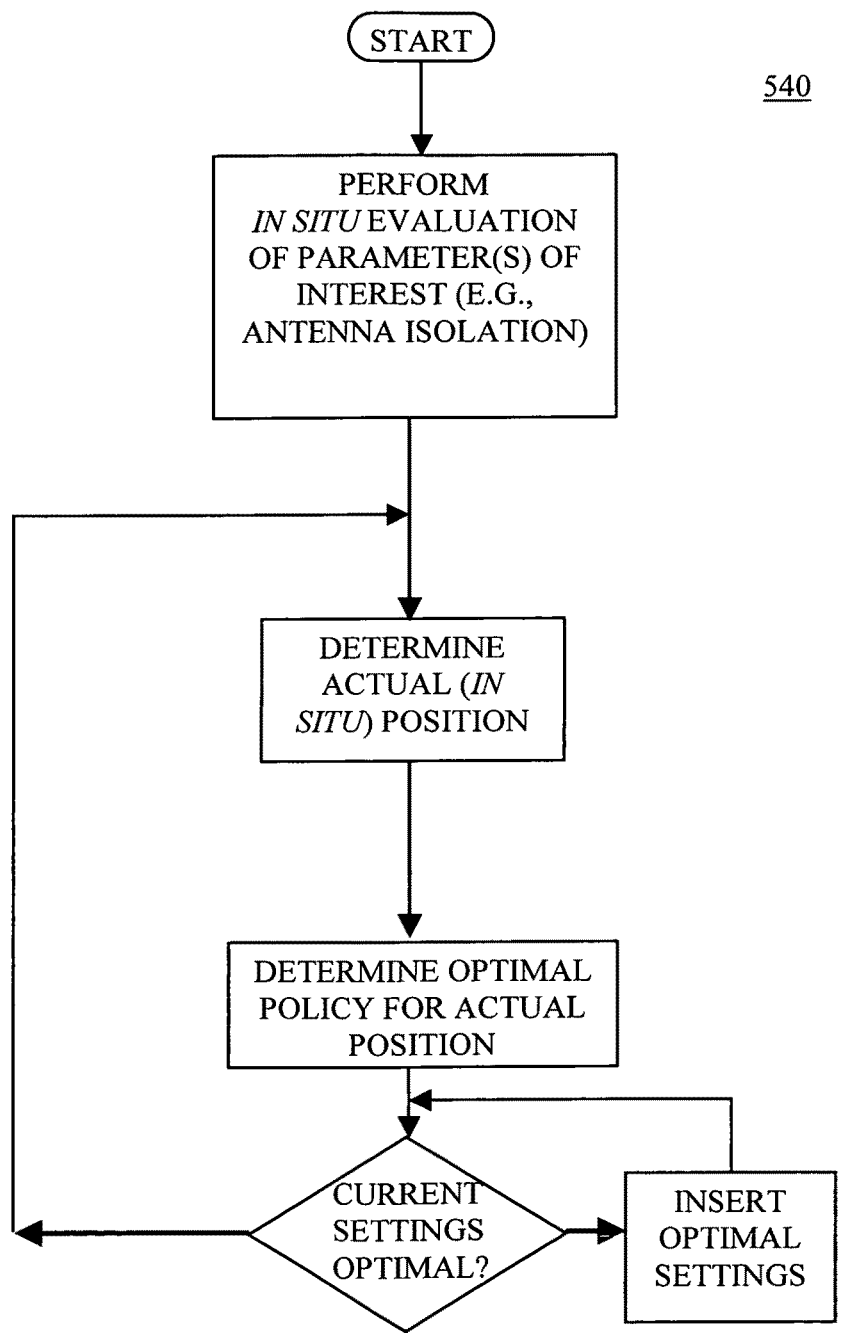
FIG. 5C is a logical flow diagram illustrating another embodiment of the dynamic configuration methodology according to the invention, wherein in situ measurement is utilized.

In the method 540 of FIG. 5C, the dynamic methodology of FIG. 5B is further modified so that a dynamic determination or evaluation of the parameter(s) of interest is performed. For example, in the context of antenna isolation, the methodology of FIG. 5C includes a dynamic (e.g., in situ) determination of isolation as a function of position and/or time. For instance, one variant of the invention comprises a client device that is outfitted with an internal "test" device capable of assessing antenna isolation at a given point in time, such as upon a signal from the aforementioned angular position sensor or algorithm indicating a change in position. The direct in situ measurement of isolation at a given point in time during use has the advantage of having an ostensibly higher level of accuracy since inter alia: (i) it is being conducted at the precise physical geometry that the two or more antennae will be used at; and (ii) it is conducted in the actual environment which the antennae will be used within. Once the measurement is completed, the optimization algorithm or other such mechanism can use the resulting data to select an appropriate optimization policy as previously described herein.

In another aspect of the invention, consumers may bring back their already purchased client devices (e.g., laptops, smartphones, etc.) for or after reconfiguration so as to have them "re-optimized" for the new configuration. Alternatively, the user's device may be configured with its own indigenous evaluation/optimization capability as previously described. For example, a laptop user might install a WiFi card themselves if their production device was not so equipped. With the new card, there may be significant interference with another existing or co-installed air interface such as Bluetooth, hence requiring optimization according to the methods described herein. The computer manufacturer, the user themselves, or a third party distributor/repair facility, could then measure the antenna isolation, and adjust the computer (e.g., program the indigenous algorithm already resident on the computer previously described) to optimize operation of the interfaces (and the device as a whole) so as to optimize the desired attributes, such as mitigation of interference.

Alternatively, it will be recognized that the client device and algorithm may be configured to perform this step automatically; e.g., by sensing the presence or addition of new hardware (e.g., WiFi card), and then conducting an antenna isolation or other parametric evaluation (or prompting the user to do so, such as via a third party). Once the isolation data is obtained, whether manually or automatically, the optimization algorithm can use this data to select the best operational policy or policies for that particular configuration.

It will be recognized that while certain aspects of the invention are described in terms of a specific sequence of steps of a method, these descriptions are only illustrative of the broader methods of the invention, and may be modified as required by the particular application. Certain steps may be rendered unnecessary or optional under certain circumstances. Additionally, certain steps or functionality may be added to the disclosed embodiments, or the order of performance of two or more steps permuted. All such variations are considered to be encompassed within the invention disclosed and claimed herein.

While the above detailed description has shown, described, and pointed out novel features of the invention as applied to various embodiments, it will be understood that various omissions, substitutions, and changes in the form and details of the device or process illustrated may be made by those skilled in the art without departing from the invention. The foregoing description is of the best mode presently contemplated of carrying out the invention. This description is in no way meant to be limiting, but rather should be taken as illustrative of the general principles of the invention. The scope of the invention should be determined with reference to the claims.

What is claimed is:

1. A method of mitigating interference between multiple wireless communication apparatus, the method comprising:
   providing a first wireless communication apparatus operative in a first frequency band;
   providing a second wireless communication apparatus operative at least partly in the first band, said second wireless communication apparatus operating according to a different communication protocol than said first wireless communication apparatus;

activating a coexistence bit on an infrastructure element indicating one of a plurality of operational protocols; and compensating for effects of interference between said first wireless communication apparatus and said second wireless communication apparatus by operating according to an indicated one of the plurality of operational protocols;

wherein the indicated one of the plurality of operation protocols comprises closed-loop operation between the infrastructure element and one or more of the multiple wireless communication apparatus.

2. The method of claim 1, further comprising:

determining isolation between said first wireless communication apparatus and said second wireless communication apparatus; and selecting said one of said plurality of protocols based at least in part on said act of determining.

3. The method of claim 1, wherein said first and second wireless communication apparatus are substantially co-located within a common, substantially portable device, and said act of operating according to the indicated one of the plurality of operational protocols comprises selecting one of a plurality of closed-loop operating modes associated within at least one of said first and second communications apparatus.

4. The method of claim 1, wherein said first and second apparatus comprise IEEE-Std. 802.11- and Bluetooth-compliant air interfaces, respectively, and said indicated one of the plurality of protocols is selected based at least in part on a level of mutual interference between said IEEE-Std. 802.11 and Bluetooth interfaces during operation of both.

5. An apparatus for use in mitigation of interference between multiple wireless communication apparatus, comprising:

a first wireless communication apparatus operative in a first frequency band;

a second wireless communication apparatus operative at least partly in the first band, the second wireless communication apparatus configured to operate in accordance with a different communication protocol than the first wireless communication apparatus;

a processor; and a non-transitory computer readable medium with at least one computer program stored thereon, the at least one computer program comprising instructions configured to, which when executed on the processor:

detect interference between the first wireless communication apparatus and the second wireless communication apparatus;

cause an activation of a co-existence mode on a remote network entity related to at least one of the two different communication protocols;

receive transmission instructions in accordance with the co-existence mode from the remote network entity; and compensate for at least one effect of interference between the first wireless communication apparatus and the second wireless communication apparatus via operation in accordance with the transmission instructions.

6. The apparatus of claim 5, wherein the first and second apparatus are substantially co-located within a common, substantially portable device.

7. The apparatus of claim 6, wherein transmission instructions are associated within at least one of the first and second communications apparatus.

8. The apparatus of claim 5, wherein the first and second wireless communication apparatus comprise IEEE-Std. 802.11- and Bluetooth-compliant air interfaces, respectively.

9. The apparatus of claim 8, wherein the co-existence mode is selected based at least in part on the level of mutual interference between the IEEE-Std. 802.11 and Bluetooth interfaces during operation of both.

10. The apparatus of claim 5, wherein the detected interference comprises antenna isolation between the first and second wireless communication apparatus.

11. The apparatus of claim 5, wherein the detected interference is measured in reference to a predetermined threshold value.

12. The apparatus of claim 5, wherein the interference detection is dynamically executed during normal operation.

13. The apparatus of claim 5, wherein the interference detection is executed during a manufacturing process.

14. A method of compensating for effects of interference between a wireless local area network (WLAN) interface and a personal area network (PAN) interface, the method comprising:

operating a WLAN interface operative in a first frequency band;

operating a PAN interface operative at least partly in the first band, the PAN interface operating according to a different communication protocol than the WLAN interface;

detecting a level of antenna isolation between the WLAN interface and the PAN interface;

when the detected antenna isolation exceeds a first threshold, turning off a hardware co-existence function of an access point associated with the WLAN interface; and when the detected antenna isolation falls below a second threshold, turning on the hardware co-existence function of the access point.

15. The method of claim 14, wherein the first threshold comprises twenty five decibels (25 dB).

16. The method of claim 14, wherein the second threshold comprises twenty five decibels (25 dB).

17. The method of claim 14, wherein the PAN interface comprises a Bluetooth interface, and the method additionally comprises activating an Adaptive Frequency Hopping (AFH) feature of the Bluetooth interface.

18. The method of claim 14, wherein the PAN interface comprises a Bluetooth interface, and the method additionally comprises:

loading a priority table; and arbitrating packets sent by both the Bluetooth and WLAN modules according to the priority table.

19. The method of claim 18, wherein the priority table is based on a Quality of Service (QoS).

20. The method of claim 18, wherein the priority table is based on a usage case.

* * * * *